(12) United States Patent
Chernichenko et al.

(10) Patent No.: US 7,737,967 B2
(45) Date of Patent: Jun. 15, 2010

(54) METHOD AND APPARATUS FOR CORRECTION OF PERSPECTIVE DISTORTION

(76) Inventors: Dmitry Alexandrovich Chernichenko, Solnechnaya Street 33, Apartment 120, Leningrad Region (RU) 188537; Krzysztof Antoni Zaklika, 1849 Hillcrest Ave., St. Paul, MN (US) 55116

( * ) Notice: Subject to any disclaimer, the term of this patent is extended or adjusted under 35 U.S.C. 154(b) by 0 days.

(21) Appl. No.: 11/772,775

(22) Filed: Jul. 2, 2007

(65) Prior Publication Data

US 2007/0280554 A1 Dec. 6, 2007

Related U.S. Application Data

(63) Continuation of application No. 10/878,984, filed on Jun. 28, 2004, now Pat. No. 7,239,331.

(60) Provisional application No. 60/545,655, filed on Feb. 17, 2004.

(51) Int. Cl.
*G06T 15/00* (2006.01)
(52) U.S. Cl. ..................................................... 345/419
(58) Field of Classification Search ........................ None
See application file for complete search history.

(56) References Cited

U.S. PATENT DOCUMENTS

| 5,870,099 | A | 2/1999 | Horii et al. |
| 6,191,827 | B1 | 2/2001 | Segman et al. |
| 6,229,548 | B1 * | 5/2001 | Edmark ...................... 345/427 |
| 6,471,637 | B1 * | 10/2002 | Green et al. ................. 600/109 |
| 6,753,907 | B1 | 6/2004 | Sukthankar et al. |
| 6,947,610 | B2 * | 9/2005 | Sun ............................ 382/293 |
| 2002/0149808 | A1 * | 10/2002 | Pilu ............................ 358/530 |
| 2002/0161280 | A1 * | 10/2002 | Chatenever et al. ......... 600/112 |

* cited by examiner

*Primary Examiner*—Ulka Chauhan
*Assistant Examiner*—Said Broome
(74) *Attorney, Agent, or Firm*—Hensley Kim & Holzer LLC

(57) ABSTRACT

Perspective distortion in an imaged scene is corrected by identifying a group of points in the imaged scene such that the group of points define a shape. Two vanishing points are determined based on the group of points in the imaged scene. The process determines a first set of reference points within the shape defined by the group of points and transforms the first set of reference points into a second set of reference points. An aspect ratio associated with the first set of reference points is adjusted and the imaged scene is transformed to reduce perspective distortion in the imaged scene.

21 Claims, 11 Drawing Sheets

METHOD AND APPARATUS FOR CORRECTION OF PERSPECTIVE DISTORTION

CROSS-REFERENCE TO RELATED APPLICATIONS

This application is a continuation application of, and claims the benefit of, U.S. patent application Ser. No. 10/878,984 filed Jun. 28, 2004, the disclosure of which is hereby incorporated by reference. This patent application also claims the benefit of U.S. Provisional Patent Application No. 60/545,655, filed Feb. 17, 2004, the disclosure of which is incorporated herein by reference.

TECHNICAL FIELD

This systems and methods described herein relate to image processing, such as providing perspective correction of an imaged scene.

BACKGROUND

When a real-life three-dimensional object is imaged onto two dimensions, the object undergoes perspective distortion. For example, perspective distortion occurs when photographing an object onto film or into a digital camera. This perspective distortion includes effects such as foreshortening, where identically sized objects become smaller the further they are from the camera and receding railroad tracks become narrower with increasing distance and appear to converge.

Another aspect of the distortion is referred to as keystoning. Keystoning can be seen in the progressive narrowing of the width of a skyscraper with height when it is photographed from sidewalk level. When the camera is not centered on the object the same keystone effect also occurs laterally. For example when the camera is pointed at an external vertical corner of a building, the adjacent sides decrease in size with distance from the corner. The perspective distortion of an object or image is governed by three orthogonally disposed vanishing points, as shown in FIG. 1. In the example of FIG. 1, the perspective distortion of object 100 is governed by three vanishing points 102, 104, and 106, each of which is orthogonal to the other two vanishing points.

Frequently, because of limitations on the physical location of the camera, perspective distortion cannot be avoided during image capture. When photographing architecture, for example, the arrangement of the surrounding buildings, streets and traffic, as well as the inability to access a vantage point of suitable height can constrain the position of the camera in a manner that causes significant perspective distortion. While it is possible to compensate for such difficulties with shift and tilt lenses, this specialized and expensive equipment is not usually possessed by a typical photographer. Moreover, these types of lenses often suffer from disadvantages of their own, such as vignetting, lack of autofocus and complexity of use.

Thus, it is common for images to be acquired with perspective distortion that the photographer seeks to correct or reduce by digital editing means.

DETAILED DESCRIPTION

The systems and methods discussed herein reduce or eliminate the effects of peripheral distortion from images acquired by a camera or other image capture device. The procedures discussed herein can be implemented by video processing hardware, video processing software, or a combination of video processing hardware and software.

Figure 1:
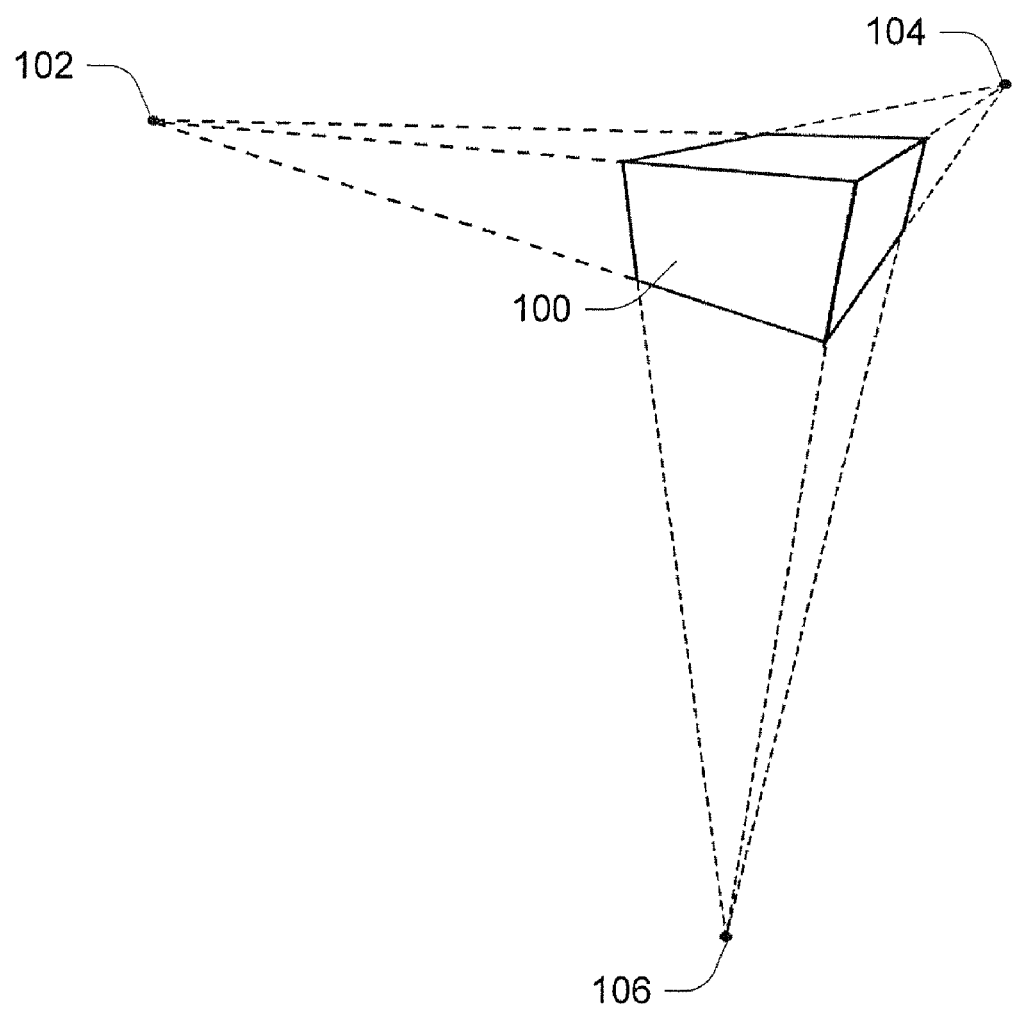
FIG. 1 illustrates an example of perspective distortion of an object.
Figure 2:
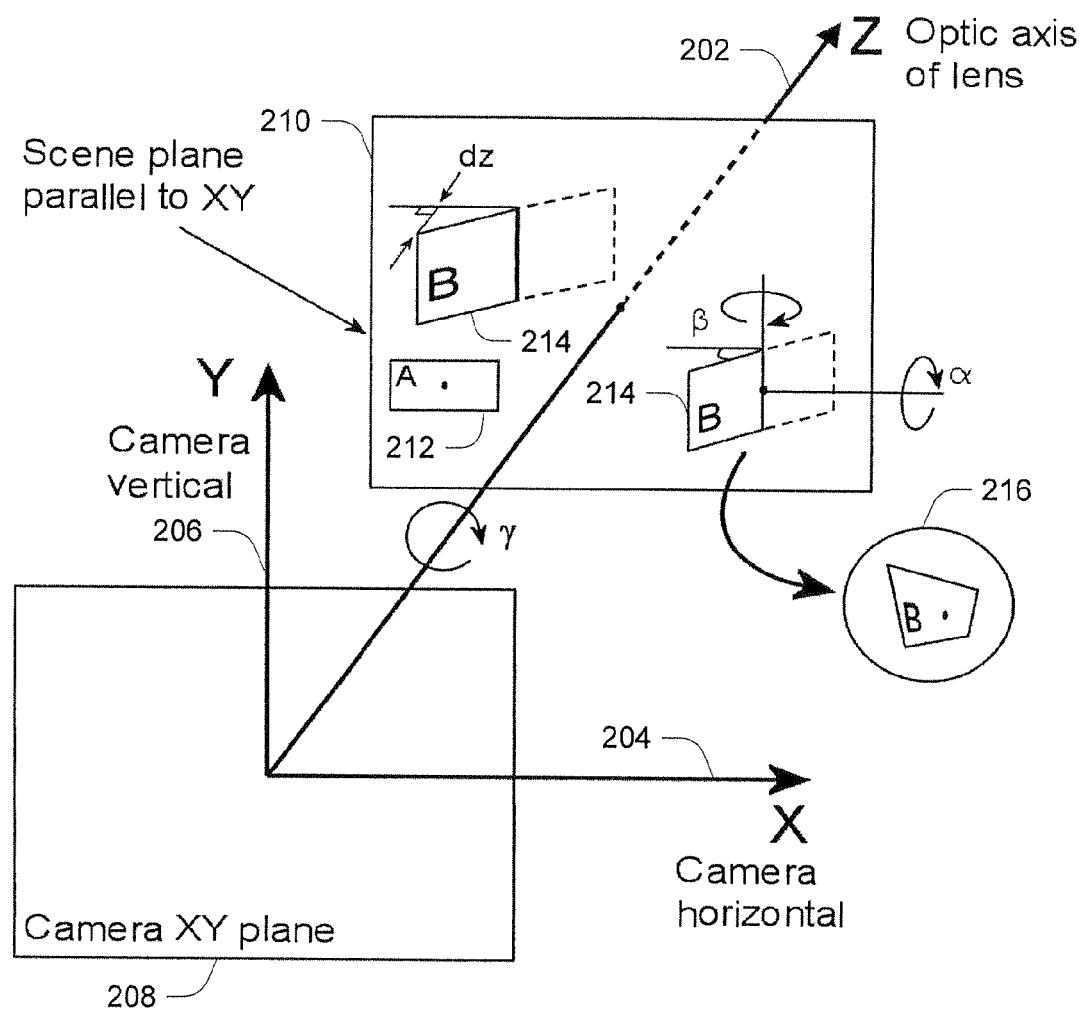
FIG. 2 illustrates problems associated with attempting to reconstruct a three-dimensional image from two-dimensional information regarding the image.

In many situations, the original real-life scene from which an image is formed cannot be reconstructed from a single photograph using perspective correction. This reconstruction is not possible because the three dimensions of the original scene cannot be uniquely determined from the solely two dimensional information within the resulting image of the scene. This problem may be overcome by using two images of the same scene taken from known locations or by camera calibration using known positions of points within the scene. However, these options are not feasible for normal photographic situations and, in those cases, the correction is underdetermined. FIG. 2 illustrates problems associated with attempting to reconstruct a three-dimensional image from two-dimensional information regarding the image.

As shown in FIG. 2, a camera's optic axis 202 points at a scene in direction Z. Orthogonal axes X and Y (identified by reference numbers 204 and 206, respectively) define the camera's horizontal and vertical axes as well as an XY plane 208. Also pictured is a parallel plane 210 in the scene centered on optical axis 202. When imaged in a camera, an object lying parallel to XY plane 208, such as rectangle A (labeled 212), undergoes no perspective distortion. As this object moves along the Z direction there is only a change of scale, i.e., the object appearing larger when moved closer to the camera and smaller when moved away. In contrast, an exemplary object such as the rectangle B (labeled 214), when rotated out of the plane parallel to the camera plane by angle $\beta$ about an axis parallel to Y, will undergo perspective distortion. The left edge of B projects in front of the plane by a distance dz and the right edge recedes behind the plane. When imaged, the object will appear similar to the image shown in corresponding circle 216. Potentially, object B could also undergo rotation by an angle $\alpha$ about an axis parallel to X in the scene plane or by an angle gamma about the Z axis. Consequently various combinations of X, Y and Z displacement along with $\alpha$, $\beta$ and $\gamma$ rotation can lead to the same vanishing points formed by extrapolation of the sides of the former rectangle.

The camera image contains the results of imaging the rotated object B 214 but carries no direct information about the value of the Z coordinates of different portions of the rectangle B. The same is true for a complete scene, which may include some objects that lie in front of the reference scene plane and some that lie behind the plane. At the same time, out-of-plane rotation leads to perceived changes in aspect ratio. This is most readily envisioned for a rectangle object centered on the Z axis and rotated through angle β in the same way as rectangle B 214. The rectangle appears narrower than before rotation and the leading edge appears longer than the rearward edge. At a rotation of 90 degrees the rectangle appears to have zero width. Consequently, in the absence of knowledge about the three-dimensional coordinates of scene components, there is considerable ambiguity about the aspect ratios of these components and what combinations of displacement and orientation create the perceived vanishing points of the components. A special situation of weak perspective arises when the depth range of the object (as measured by dz) is small with respect to the viewing distance along the Z axis.

Perspective transformation does not typically preserve parallelism of lines. For example, distances and ratios of distances are not generally preserved. Additionally, aspect ratios and area ratios are not typically preserved; nor is symmetry. However, line intersections and the collinearity of points are typically preserved. Perspective transformation also preserves cross-ratios, which are ratios of distance ratios. For example, four collinear points define six possible ratios of ratios of distances between the points that are invariant under perspective. Cross-ratios can also be established using four lines intersecting at a single point. However, cross-ratios cannot be established using a quadrilateral defined in the image. It may be difficult to achieve consistent corrections that are compatible with the real shape of the object that has been imaged. However, this is a highly desirable and useful objective to achieve.

The various systems and methods described herein provide perspective correction of an imaged scene, while still maintaining a good approximation of the aspect ratios of objects contained in the imaged scene. In some implementations, four cyclically ordered non-collinear points are provided within the image corresponding to four points of known arrangement within the scene. The points within the image are used to define two perspective vanishing points. A first set of reference points is established within the image, which are transformed with respect to the aforementioned vanishing points to provide a second set of reference points from which an aspect ratio is estimated. The first set of reference points is modified to have the same aspect ratio as the estimate. A transformation of the image is constructed as that which maps the second set of reference points onto the modified first set of reference points.

In accordance with another implementation described herein, systems and methods provide an improved estimate of the aspect ratio along with an appropriate scale for the transformed scene. This is achieved by providing a center reference point derived from the four cyclically ordered non-collinear points within the image that correspond to four points of known arrangement within the scene. A first and second set of reference points are centered on this center reference point. The image transformation is constrained such that the image size at the center reference point does not change.

In accordance with another implementation described herein, a procedure includes the steps of designating a quadrilateral region in an image, the quadrilateral region being associated with an object in the image. The designated quadrilateral region is used to define at least one vanishing point. The procedure then uses a weak perspective approximation to determine an aspect ratio of the designated quadrilateral region and modifies the object in the image using the determined aspect ratio.

Figure 3:
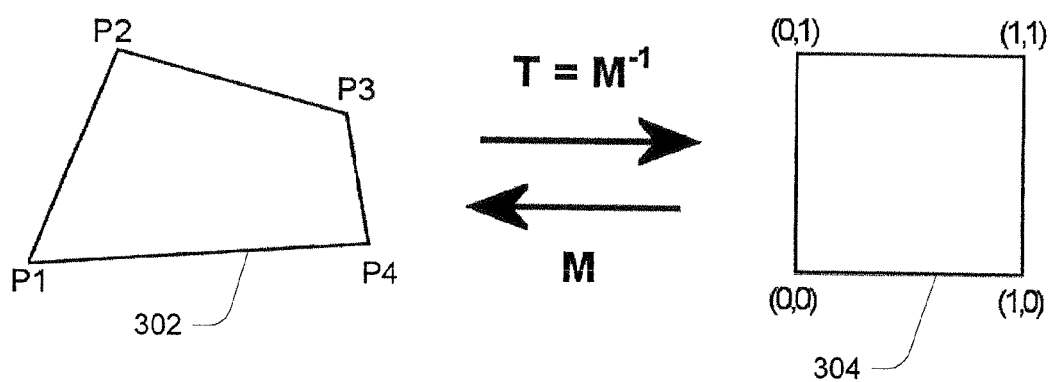
FIG. 3 illustrates an example of mapping a quadrilateral onto a square using a transformation matrix.

Perspective projection may be discussed in terms of mapping a quadrilateral onto a square using a transformation matrix T. The inverse mapping of a square to a quadrilateral is accomplished using a transformation matrix M, which is the inverse of matrix T. FIG. 3 illustrates an example of mapping a quadrilateral 302 onto a square 304 using a transformation matrix T. As shown in FIG. 3, four points P1, P2, P3 and P4, each having an x, y image coordinate, define the quadrilateral 302 in an image.

To construct the perspective projection matrix, the coordinates of the points are expressed in homogeneous coordinates X',Y',Z'. Z' may be chosen to have any convenient non-zero value and is typically assigned the value 1, such that X=X'/Z' and Y=Y'/Z'. A new set of coordinates U',V',W' is obtained by linear combination of coordinates X',Y',Z' in the perspective transformation and the result is obtained by projection of U',V',W' onto U,V such that U=U'/W' and V=V'/W'.

The matrix M contains the terms:

$$M = \begin{bmatrix} m_{11} & m_{12} & m_{13} \\ m_{21} & m_{22} & m_{23} \\ m_{31} & m_{32} & m_{33} \end{bmatrix}$$

and the matrix T can be formed as the inverse of matrix M as follows:

$$T = M^{-1} = \frac{adj(M)}{\det(M)} = \begin{bmatrix} t_{11} & t_{12} & t_{13} \\ t_{21} & t_{22} & t_{23} \\ t_{31} & t_{32} & t_{33} \end{bmatrix}$$

where adj(M) is the adjoint of M and det(M) is the determinant of M. Given four cyclically ordered non-collinear points Pn in image space X,Y, having image coordinates Pn.x and Pn.y, we can define the quantities:

$$\sum x = P1.x - P2.x + P3.x - P4.x$$
$$\sum y = P1.y - P2.y + P3.y - P4.y$$

If both Σx=0 and Σy=0 then both sides of the quadrilateral define vanishing points which both lie at infinity and the quadrilateral has the shape of a parallelogram. In this situation, the component terms of matrix M are:

$$m_{11} = P2.x - P1.x \quad m_{21} = P2.y - P1.y \quad m_{31} = 0$$
$$m_{12} = P3.x - P2.x \quad m_{22} = P3.y - P2.y \quad m_{32} = 0$$
$$m_{13} = P1.x \quad\quad\quad\; m_{23} = P1.y \quad\quad\quad\; m_{33} = 1$$

If either Σx≠0 or Σy≠0 then there is at least one real vanishing point not at infinity and the components terms of matrix M are:

$$m_{11} = P2.x - P1.x + m_{31} * P2.x \quad m_{21} = P2.y - P1.y + m_{31} * P2.y$$
$$m_{12} = P4.x - P1.x + m_{32} * P4.x \quad m_{22} = P4.y - P1.y + m_{32} * P4.y$$
$$m_{13} = P1.x \quad\quad\quad\quad\quad\quad\quad m_{23} = P1.y$$

$$m_{31} = \frac{\sum x * dy2 - \sum y * dx2}{\det}$$

$$m_{32} = \frac{\sum y * dx1 - \sum x * dy1}{\det}$$

$$m_{33} = 1$$

where the symbol * is used to denote multiplication and $$dx1 = P2.x - P3.x$$
$$dx2 = P4.x - P3.x$$
$$dy1 = P2.y - P3.y \quad \text{and} \quad \det = dx1 * dy2 - dx2 * dy1$$
$$dy2 = P4.y - P3.y$$

To transform the quadrilateral into a rectangle rather than a square the transformation matrix T is pre-multiplied by a scaling matrix, S, of the form:

$$S = \begin{bmatrix} S_x & 0 & 0 \\ 0 & S_y & 0 \\ 0 & 0 & 1 \end{bmatrix}$$

where $S_x$ and $S_y$ are scaling factors along X and Y respectively that transform a square into a rectangle of aspect ratio Sx/Sy.

Figure 6:
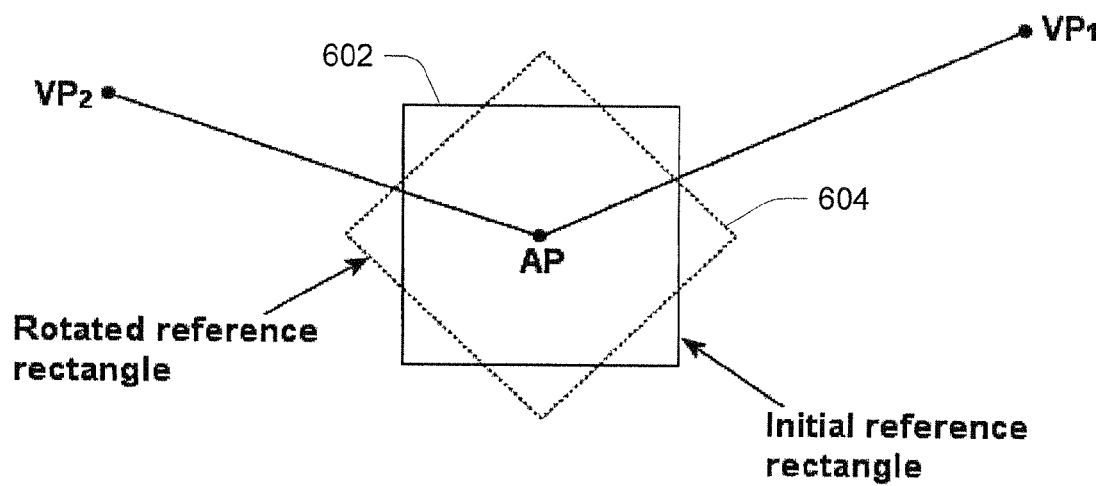
FIG. 6 illustrates an example of rotating an initial reference rectangle.

In general, perspective projections map the line at infinity onto a line in the image plane. The latter is the horizon line of the vanishing points. When the quadrilateral defined by the points Pn corresponds to a rectangle in the original scene, vanishing points may be defined by extension of opposite sides of the quadrilateral to a point of intersection. This is illustrated in FIG. 6 (further discussed below) where the vanishing points are labeled $VP_1$, and $VP_2$ and the horizon line passes through these points. In X,Y space, the coordinates of the vanishing points are:

$$VP_1 = \begin{bmatrix} \frac{m_{11}}{m_{31}} \\ \frac{m_{21}}{m_{31}} \end{bmatrix}, \quad VP_2 = \begin{bmatrix} \frac{m_{12}}{m_{32}} \\ \frac{m_{22}}{m_{32}} \end{bmatrix},$$

and the equation of the horizon line is:

$$m_{31}*X + m_{32}*Y + m_{33} = 0$$

Figure 4:
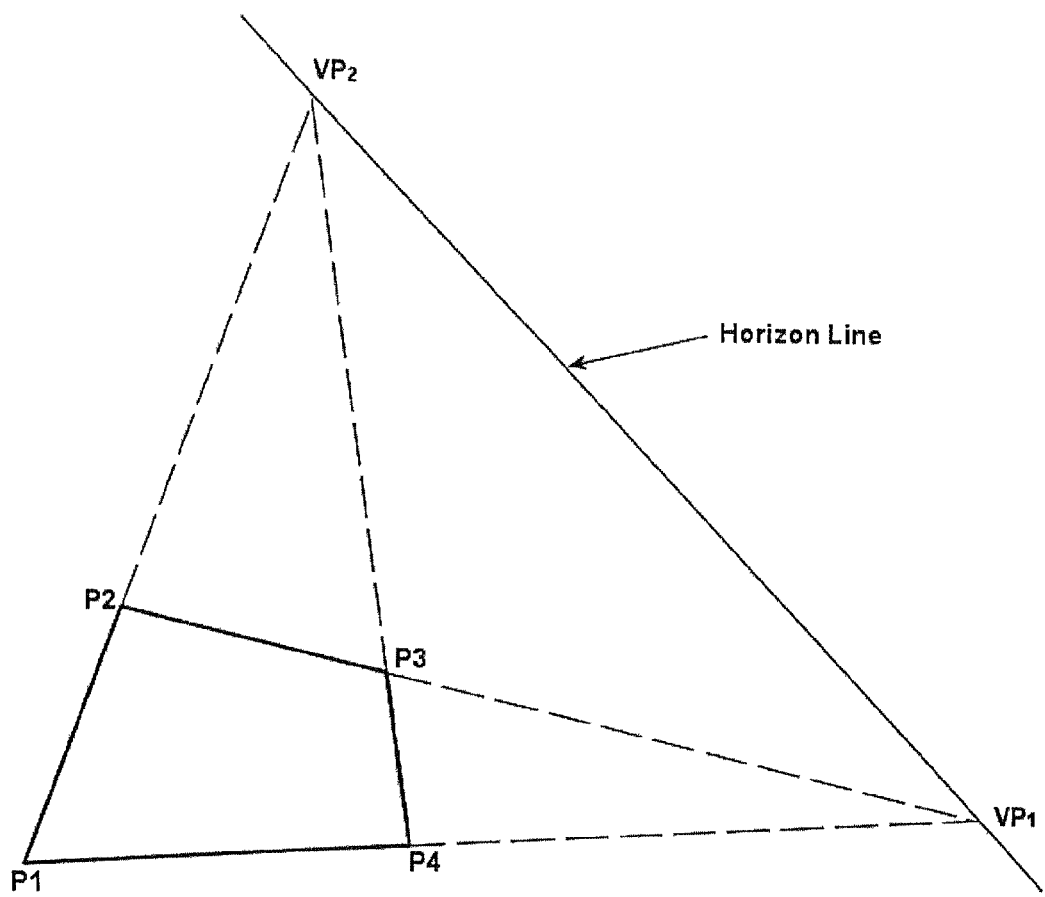
FIG. 4 illustrates an example of identifying two perspective vanishing points associated with a quadrilateral shape.

If $m_{31}=0$ then vanishing point $VP_1$ lies at infinity, whereas if $m_{32}=0$ then vanishing point $VP_2$ lies at infinity, as shown in FIG. 4. When one vanishing point lies at infinity, the horizon line lies parallel to the parallel sides of the quadrilateral and passes through the remaining vanishing point. In the event that both vanishing points lie at infinity the transformation is a simple skew and the horizon line is undefined.

In discussing the scale of the transformed image, it is convenient to define the Jacobian, J, of the transformation matrix M at a point X,Y in the image, which is:

$$J = \begin{bmatrix} j_{11} & j_{12} \\ j_{21} & j_{22} \end{bmatrix} = \begin{bmatrix} dU/dx & dU/dy \\ dV/dx & dV/dy \end{bmatrix}$$

Defining u, v and w as follows:

$$u = m_{11}*X + m_{12}*Y + m_{13}$$
$$v = m_{21}*X + m_{22}*Y + m_{23}$$
$$w = m_{31}*X + m_{32}*Y + m_{33}$$

the terms of the Jacobian matrix are given by:

$$j_{11} = \frac{m_{11} - \frac{u}{w}m_{31}}{w} \quad j_{21} = \frac{m_{21} - \frac{v}{w}m_{31}}{w}$$

$$j_{12} = \frac{m_{12} - \frac{u}{w}m_{32}}{w} \quad j_{22} = \frac{m_{22} - \frac{v}{w}m_{32}}{w}$$

If the eigenvalues of the Jacobian matrix are v1 and v2, the inverse of the minimal eigenvalue of the Jacobian matrix:

$$M(J) = \frac{1.0}{\min(v1, v2)}$$

defines a metric that measures the change in local scale at the point X,Y caused by the transformation M. In other words, it measures expansion or compression of the perspective-corrected result image relative to the original source image.

In accordance with various implementations described herein, a transformation M and its desired inverse T are chosen to depend on the vanishing points $VP_1$, and $VP_2$ defined by a user-supplied quadrilateral. The transformation does not depend on the size and position of the user-supplied quadrilateral. Any quadrilaterals that define the same vanishing points define approximately the same transformation of the overall image. Correction thus produces consistent results for different quadrilaterals. Additionally, the corrected object has an aspect ratio consistent with that experienced in real life.

In particular embodiments, benefits are achieved by the use of reference shapes to define the perspective correction transformation. For example, a reference rectangle may be established in the uncorrected image and a reference quadrilateral may be constructed using this rectangle and the vanishing points defined by a user-supplied quadrilateral. An aspect ratio can be derived from the reference quadrilateral and used to modify the aspect ratio of the reference rectangle. The correction transformation matrix, T, is chosen to be that which maps the reference quadrilateral onto the modified reference rectangle. In one implementation, the transformation matrix is chosen to maintain the image scale at a reference point common to both the reference rectangle and the derived reference quadrilateral.

Other benefits can be achieved by providing four cyclically ordered non-collinear points within the image corresponding to four points of known arrangement within the scene. The points within the image are supplied by the user and may be chosen within wide limits provided that the user can also define the arrangement of the corresponding points within the original scene that was imaged. Typically, however, the user knows very little about the quantitative three-dimensional geometry of the original scene. This is what causes the difficulty in correcting the perspective distortion. Accordingly, in one embodiment, the user-supplied points correspond to some readily recognizable shape within the scene, such as a planar shape. For example, the shape may be a rectangle, a triangle, a hexagon, or a circle.

Joining the user-supplied points in cyclical order defines the sides of a quadrilateral. Extension of opposite sides of the quadrilateral to an intersection defines two vanishing points. One or more of these vanishing points may lie at infinity, which occurs when the sides of the quadrilateral being extended are parallel to each other. These vanishing points are used to derive the perspective correction transformation of the invention. The construction of the vanishing points is shown in FIG. 4 by the dashed lines.

A first set of reference points is established within the image. The first set of reference points is transformed with respect to the aforementioned vanishing points to provide a second set of reference points from which an aspect ratio is estimated. The first set of reference points is modified to have the same aspect ratio as the estimate. A transformation of the image is constructed as that which maps the second set of reference points onto the modified first set of reference points.

The first set of reference points may be chosen within wide limits provided that they are not collinear. The points are associated with a cyclical ordering such that joining the points in order creates a quadrilateral with non-intersecting sides. The points may be located anywhere within the image, or even outside the image, subject to the constraint that they lie on the same side of the horizon line as the user-supplied points. In one implementation, the points lie within the image and, particularly, in the vicinity of the user-supplied points. Furthermore, the first set of reference points may be centered on the user-supplied points.

The quadrilateral formed by joining the points in order may be of any shape. In certain embodiments, more accurate results may be obtained when the quadrilateral is a rectangle. In one implementation, the rectangle is aligned with the image edges, thus eliminating the need to include a rotation as part of the perspective transformation. The arrangement is also consistent with the typical user-supplied quadrilateral representing a rectangular scene object having vertical and horizontal sides. In particular implementations, the form of rectangle is a square. In one embodiment, the square is centered on the user-supplied points. An exemplary square reference rectangle is shown in FIG. 5.

Figure 5:
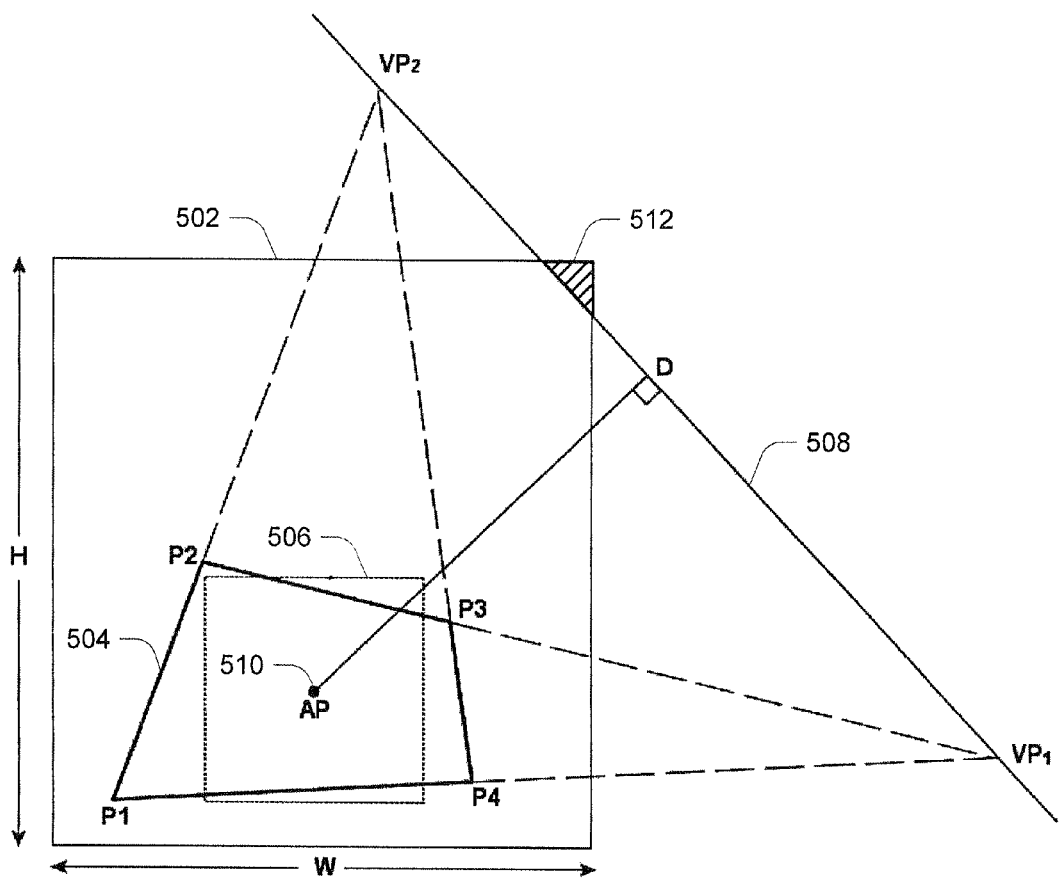
FIG. 5 illustrates an example user-supplied quadrilateral and a reference rectangle associated with an image.

FIG. 5 illustrates an example user-supplied quadrilateral 504 and a reference rectangle 506 associated with an image 502. FIG. 5 shows the construction of reference rectangle 506 in the general case where neither of the two vanishing point ($VP_1$, and $VP_2$) lies at infinity. The user places the quadrilateral 504 in the image 502. User-supplied quadrilateral 504 is defined by points P1, P2, P3 and P4, which the user desires to become a rectangle after perspective correction. Extension of the opposite sides of the quadrilateral, as shown by the dashed lines, defines vanishing points $VP_1$, and $VP_2$. A horizon line 508 joins the two vanishing points.

A reference point AP (labeled with reference number 510) is selected within user-supplied quadrilateral 504. This reference point may be chosen by any convenient means. For example, it may be taken as the point of intersection of the diagonals P1-P3 and P2-P4 of the quadrilateral. In one embodiment which minimizes numerical error, point AP is selected as the center of gravity or centroid of the coordinates of P1 through P4. A point D lies on horizon line 508 and defines the point of intersection of a line drawn from point AP to horizon line 508 such that the line is perpendicular to horizon line 508.

Reference rectangle 506 is centered on the reference point AP as shown by the dotted lines. Initially, reference rectangle 506 is chosen to be a square. The length of the sides of the square may be chosen within wide limits. However, in some situations, very small squares may increase numerical error. If a square is chosen that is so large as to intersect horizon line 508, regions on the far side of horizon line 508, such as the cross-hatched portion 512 of the image, cannot be reconstructed by perspective transformation.

In one embodiment, the size of the square is determined using the following equation:

$$\min\left(\frac{\min(W, H)}{4}, \frac{\|AP, D\|}{4*sqrt(2)}\right)$$

where $\|AP, D\|$ denotes the distance from the point AP to the point D in X,Y image coordinate space, and W and H are the width and height, respectively, of the image in the same coordinate space. However, factors (divisors) other than about four may also be used, for instance values in the range of about 1 to 10.

FIG. 6 illustrates the situation where the lines from the vanishing points $VP_1$, and $VP_2$ through point AP do not pass through adjacent sides of a reference rectangle 602. In this situation, reference rectangle 602 is rotated by 45 degrees to ensure that the lines do pass through adjacent sides, as illustrated by the dotted rectangle 604.

Figure 7:
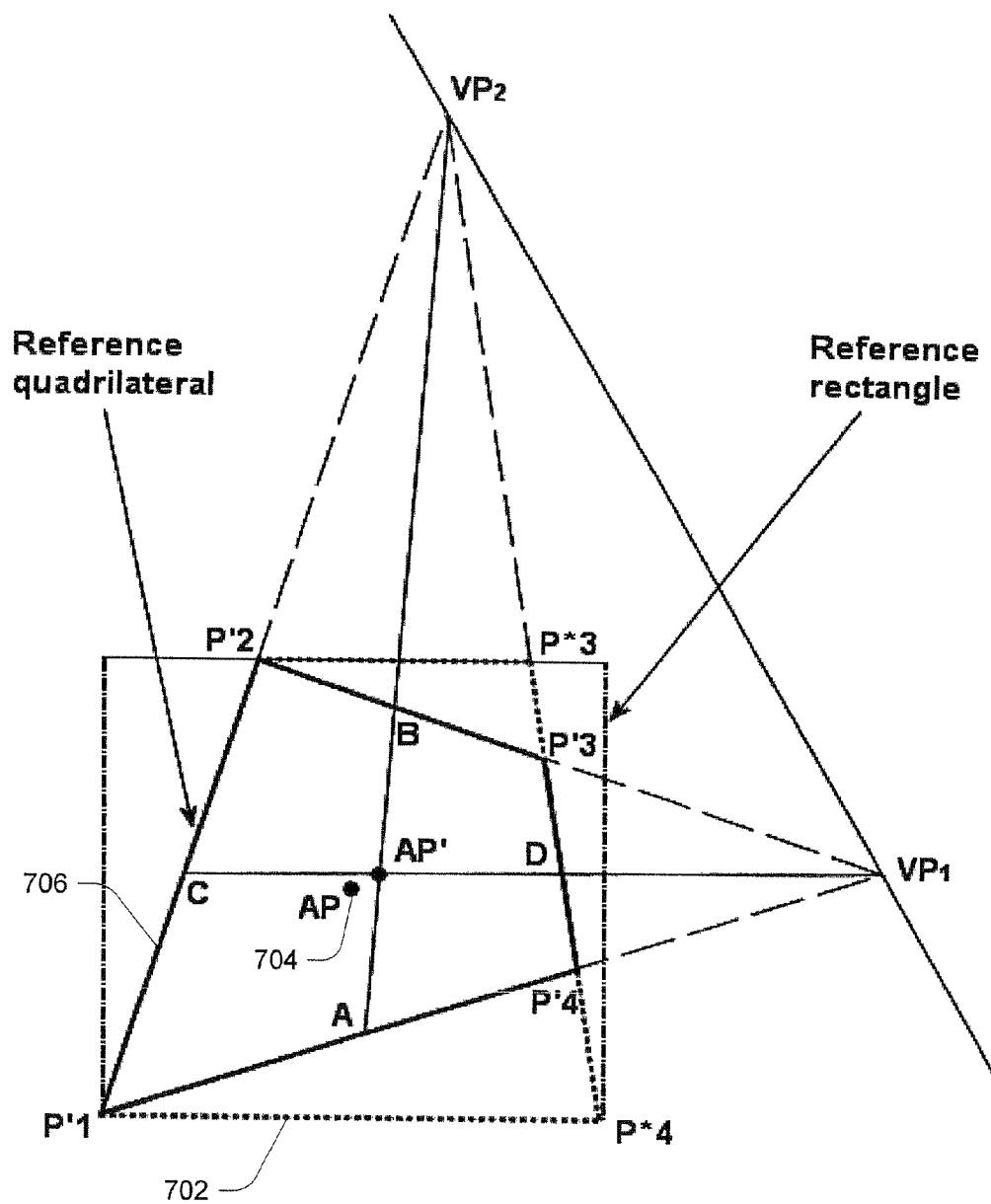
FIGS. 7 and 8 illustrate various reference quadrilaterals, reference rectangles, and associated vanishing points.

After identifying an initial reference rectangle, a derived reference quadrilateral is constructed from the initial reference rectangle, the reference point and the vanishing points being obtained from the original user-supplied quadrilateral. The reference quadrilateral is inscribed inside the reference rectangle such that the extensions of the sides of the quadrilateral converge at the previously established vanishing points. FIG. 7 shows a reference rectangle 702, a reference point AP 704 and a derived reference quadrilateral 706 with corners at the points P'1, P'2, P'3 and P'4. For convenience, the creation of the derived reference quadrilateral 706 is described as a two-step process.

Initially, the vanishing point most distant from the reference point AP is identified. In FIG. 7 this vanishing point is VP2. The side opposite the side of reference rectangle 702 that is intersected by the extension of the line from vanishing point VP2 to the reference point (AP) is identified. An interim reference quadrilateral is constructed by joining the ends of this side (P'1 and P*4) to the vanishing point VP2 with two lines, shown with long dashes. The remaining corners of the interim reference quadrilateral are defined by the intersection of these lines with the opposite side of the reference rectangle at P'2 and P*3.

In the second step, the side opposite the side of the interim quadrilateral that is intersected by the extension of the line from the second, closer, vanishing point VP1 to the reference point (AP) is identified. In FIG. 7 this is the side P'1 to P'2. The final reference quadrilateral side is constructed by joining the ends of this side (P'1 and P'2) to the vanishing point VP1 with two lines, shown with long dashes. The remaining corners of the final reference quadrilateral are defined by the intersection of these lines with the opposite side of the interim reference quadrilateral at P'3 and P'4.

To compute an aspect ratio, four additional points may be defined. The points may, for instance, be formed by the intersections of a line from a vanishing point with two opposite sides of the quadrilateral. In FIG. 7, A and B represent such points, where a line from vanishing point $VP_2$ intersects quadrilateral sides P'1-P'4 and P'2-P'4. C and D are two other such points formed by the intersection of a line from vanishing point $VP_1$, with quadrilateral sides P'1-P'2 and P'3-P'4. There are no restrictions on the position of the intersection points provided they lie within a side of the quadrilateral as defined by its corners. The points can be coincident with the corners.

In an alternative implementation, the points A, B, C and D may be taken as the midpoints of the sides. However, the points can be selected such that the lines from the vanishing points intersect at point AP. The points may also be selected such that the lines from the vanishing points intersect at point AP', where point AP' is the center of gravity or the centroid of the corners P' of the quadrilateral, since can reduce the mean error of the correction.

Without regard to one specific method of deriving points, additional points A, B, C and D, and aspect ratio AR can be defined according to:

$$AR = \frac{\left(1 - \frac{\|C, VP_1\| - \|D, VP_1\|}{\|C, VP_1\|}\right) * \|A, B\|}{\left(1 - \frac{\|A, VP_2\| - \|B, VP_2\|}{\|A, VP_2\|}\right) * \|C, D\|}$$

where the notation $\|R, S\|$ denotes the distance between points R and S in image space.

In addition to expressing the aspect ratio in terms of points A, B, C and D, aspect ratios AR1 and AR2 may be defined in terms of the corners of the quadrilateral, such as:

$$AR1 = \frac{\left(1 - \frac{\|P'_1, VP_1\| - \|P'_4, VP_1\|}{\|P'_1, VP_1\|}\right) * \|P'_1, P'_2\|}{\left(1 - \frac{\|P'_1, VP_2\| - \|P'_2, VP_2\|}{\|P'_1, VP_2\|}\right) * \|P'_1, P'_4\|} \text{ and:}$$

$$AR2 = \frac{\left(1 - \frac{\|P'_1, VP_1\| - \|P'_4, VP_1\|}{\|P'_1, VP_1\|}\right) * \|P'_4, P'_3\|}{\left(1 - \frac{\|P'_4, VP_2\| - \|P'_3, VP_2\|}{\|P'_4, VP_2\|}\right) * \|P'_1, P'_4\|}$$

A final aspect ratio may be derived as linear combination of AR1 and AR2 according to:

$$AR = \frac{w1 * AR1 + w2 * AR2}{w1 + w2}$$

where w1 and w2 are weighting coefficients. For example, w2 may be taken as (1−w1). A formulation using a weighted combination may be useful if additional information is available about the scene contents, the image of which is being corrected. For example, a known rotation β or displacement dz out of the scene plane as shown in FIG. 4 may be used to guide the choice of weights.

Given the aspect ratio, AR, determined from the derived reference quadrilateral, the initial reference rectangle is modified to have the aspect ratio AR. Any convenient method may be used to adjust the aspect ratio of the reference rectangle. However, it is desirable to set the longer side of the rectangle to be the unchanged length of the original square and to choose the length of the shorter side to give a rectangle of aspect ratio AR. Such an approach avoids the reference rectangle expanding to touch or cross the horizon line. The modified reference rectangle having the desired aspect ratio remains centered on the reference point AP.

Finally, the transformation matrix, T, and the scaling matrix, S, which together map the reference quadrilateral onto the modified reference rectangle are constructed using procedures such as those discussed herein. The transformation is additionally constrained by using the Jacobian such that the image scale in the vicinity of reference point AP remains unchanged after perspective correction using matrices S and T. Matrices S and T may be pre-multiplied to give matrix T'. The location of image points in three dimensions is computed as:

$$\begin{pmatrix} U' \\ V' \\ W' \end{pmatrix} = T' * \begin{pmatrix} X' \\ Y' \\ Z' \end{pmatrix}$$

and the result image is obtained by projection onto the U,V plane using U=U'/W' and V=V'/W'. In accordance with one implementation, the transformation matrix may be applied directly or decomposed as described in U.S. Pat. No. 5,808,623.

The construction procedure is equivalent to using the weak perspective approximation, which applies when the viewing distance is large with respect to depth range of object in the scene. As noted in the Appendix (Chapter 23) of "Geometric Invariance in Computer Vision", Joseph L. Mundy and Andrew Zisserman, Eds., MIT Press, 1992, p. 463, the weak perspective approximation is equivalent to treating the perspective transformation as an orthographic projection onto the image plane followed by isotropic scaling of image coordinates.

Though this may be a poor approximation for the entire scene, the weak perspective approximation frequently applies locally to specific objects in the scene that the user chooses to correct. Even when the weak perspective approximation is a poor one locally, the methods described herein still give an approximation of the true aspect ratio of the object being corrected. As such, it is a considerable advance over other methods where the aspect ratio varies widely and unnaturally depending on the size and position of the user-supplied quadrilateral and where using fixed vanishing points does not lead to consistent corrections.

Figure 8:
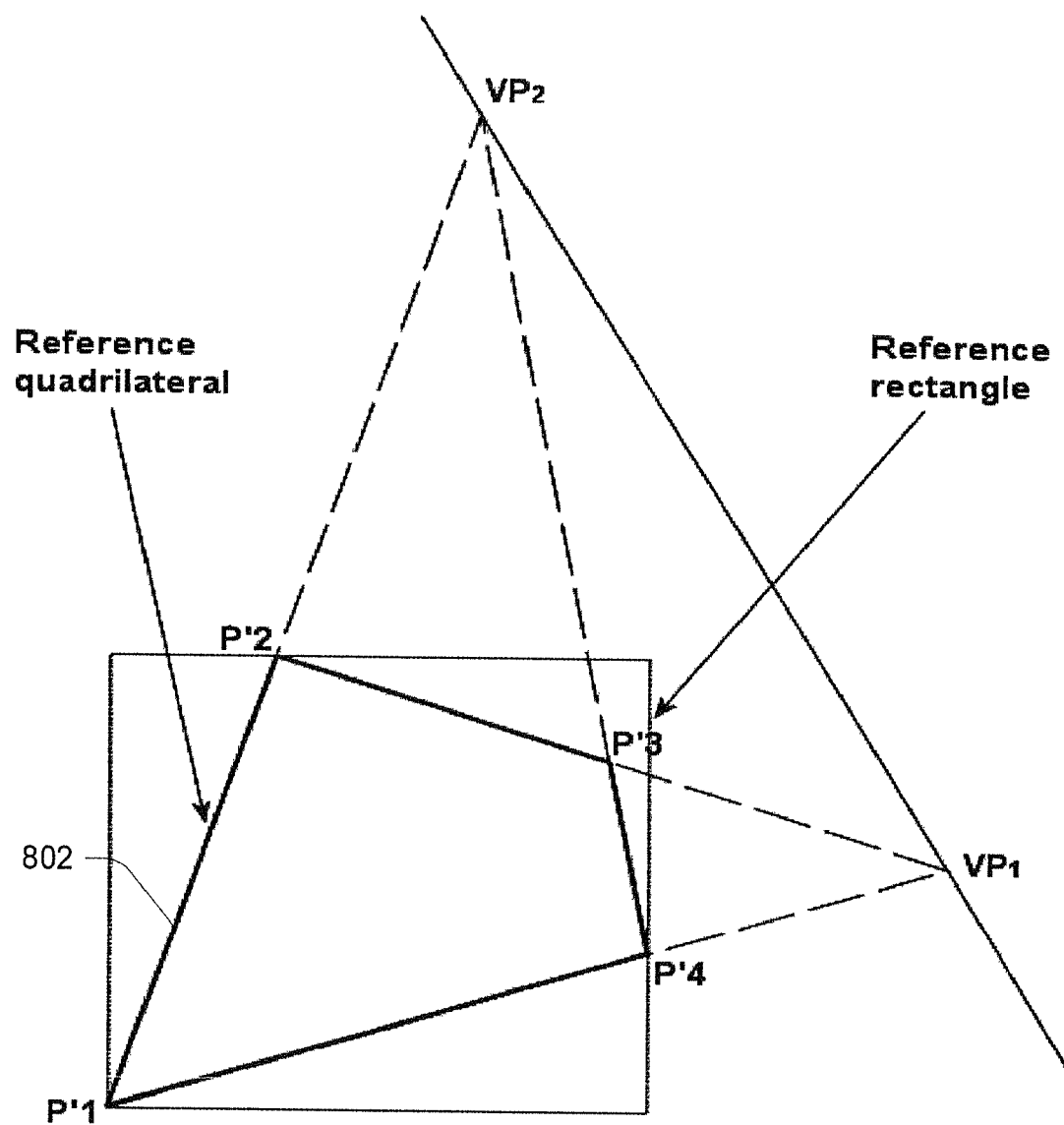

Alternative constructions of the reference quadrilateral are also possible, such as that shown in FIG. 8, where a reference quadrilateral 802 is again designated by the points P'1, P'2, P'3 and P'4. Such alternative constructions produce acceptable results using the given aspect ratio expression when the perspective distortion is small and the vanishing points are distant. However, for the most general applicability the method of constructing the reference rectangle described in FIG. 8 is desirable.

FIGS. 5, 6 and 7 illustrate the most general case when there are two vanishing points, i.e., neither pair of opposite sides in the user-supplied quadrilateral are parallel. Two additional cases arise, that where one vanishing point is at infinity and that where both vanishing points are at infinity. In the former case the aspect ratio equation becomes the limit as the vanishing point tends to infinity, namely if VP1 lies at infinity:

$$AR = \frac{\|A, B\|}{\left(1 - \frac{\|A, VP_2\| - \|B, VP_2\|}{\|A, VP_2\|}\right) * \|C, D\|}$$

and if VP2 lies at infinity:

$$AR = \frac{\left(1 - \frac{\|C, VP_1\| - \|D, VP_1\|}{\|C, VP_1\|}\right) * \|A, B\|}{\|C, D\|}$$

When both vanishing points lie at infinity, either the user has supplied a rectangle or a parallelogram. In the former case no correction is required. In the latter case the aspect ratio of the rectangle is:

$$AR = \frac{\|A, B\|}{\|C, D\|}$$

In other words, the ratio of the sides of the modified reference rectangle is the same as the ratio of the sides of the parallelogram supplied by the user. In all cases where there are fewer than two vanishing points the transformation matrix is constructed in the same way as for the case of two vanishing points.

The correction transformation may be applied to the image in a variety of ways. For example, the result may be confined to a rectangle corresponding to the contents of the user-supplied quadrilateral. From a user convenience standpoint this may not be optimal. The reason is that the image feature which the user knows to be rectangular in the real-life scene may form only a small portion of the scene. Consequently after transformation in this way the vast majority of the scene is lost. In general there is no relationship between the size of a rectangular object in the original scene and the size of the overall scene.

An alternative is to provide the user with a result image that contains as much of the scene as possible. This of course implies that portions of the original image may be missing and that not all of the result image may contain valid image data. The missing portions will be any parts of the image that happen to lie on the opposite side of the horizon line to the user-supplied quadrilateral.

Missing data arise for the following reason. Since a user-supplied quadrilateral is transformed into a rectangle, the borders of the initially rectangular image form a quadrilateral after transformation. When the result is fitted to a rectangular image bounding box, regions between the edges of the quadrilateral and the edges of the image contain no data because they correspond to matter outside the original uncorrected image.

When portions of the image lie beyond the horizon line, the actual result image need not be a quadrilateral. It may, for example, be a triangle or a pentagon. However, there will still be gaps between the border of this figure and the image edges. These gaps may be represented by filling with a chosen background color or with transparency. Later the user may elect to fill these regions by cloning matter from valid portions of the image or from a second suitable image.

While this approach has the benefit of retaining the maximum possible amount of the original scene it may also be sub-optimal in some cases. For example, if the perspective distortion is severe, regions of the image far from the reference point in the user-supplied quadrilateral may undergo extreme expansion. Such expanded regions do not contain any useful image detail yet contribute to a large increase in image size, which may require very large amounts of memory for image storage and cause sluggish response of the image editor.

One compromise between retaining scene content and restricting the size of the image to only useful matter is the following. The result image is constrained to contain only those regions whose expansion is less than some threshold as judged by the Jacobian metric. A suitable maximal expansion factor may be, for instance, from about 2 to 10, with a particular example value of about 5. This approach provides significant useful image content that is not excessively blurred, along with regions of missing data around parts of the corrected image. When this data is supplied from another source, maximal usage may be made of the original scene even when the perspective is extreme.

However, there are also users who have not the skill or inclination to fill regions of missing data in the corrected image or who have no need to retain a maximal amount of the original scene after correction. These users may benefit from an alternative implementation in which the image obtained by the previous method is cropped to the largest inscribed rectangle that does not contain any missing data.

Due to the sensitivity of the accuracy of the perspective correction to precise placement of the user-supplied quadrilateral it is desirable not to position the quadrilateral in integer pixel units. Instead, sub-pixel positioning may be used. This may be achieved by zooming the image to enlarge it and then mapping the screen coordinates in which to quadrilateral is drawn to fractional image coordinates.

Additionally, since the positioning accuracy for a good correction may not be understood by the user, it may be advantageous to provide a mechanism for undoing the transformation without loss of the previous position of the user-supplied quadrilateral. This allows the user to fine-tune the correction without having to redraw the quadrilateral from memory.

In order to judge the accuracy of the correction, it may be useful to provide reference lines in the form of a grid or guidelines to judge the straightness of corrected objects in the image. This allows very slight residual tapering of objects to be detected.

When the possibility of lens distortion exists in the image, it can be beneficial to include in the perspective correction tool a means of lens distortion correction prior to perspective correction. Such a lens correction may be accomplished by polynomial-based warping of the image. After perspective correction an uncorrected lens distortion is compounded with the perspective transformation and becomes very difficult to compensate.

Figure 9:
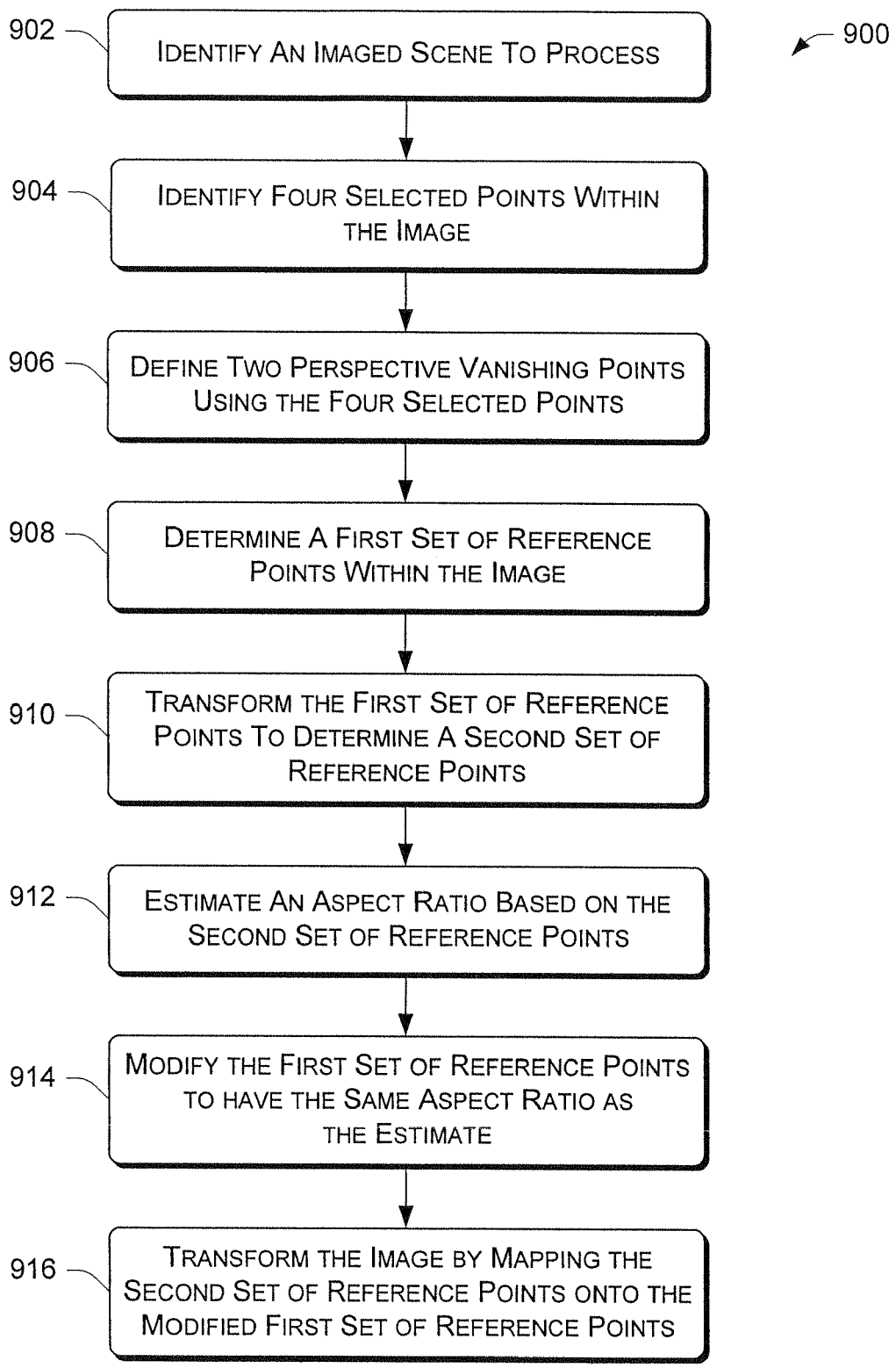
FIG. 9 is a flow diagram illustrating an embodiment of a procedure for processing image data.

FIG. 9 is a flow diagram illustrating an embodiment of a procedure 900 for processing image data. The procedure identified in FIG. 9 is a summary of the more detailed procedures, calculations, and transformations discussed herein. Additionally, FIG. 9 represents one possible procedure for processing image data. Alternate embodiments may omit one or more steps shown in FIG. 9 and/or add one or more steps not shown in FIG. 9.

Initially, procedure 900 identifies an imaged scene to process (block 902). The imaged scene may be a photograph, a digitized image, or other representation of a scene. The procedure then identifies four selected points within the image (block 904). These four points are identified, for example, by a user and form a quadrilateral shape. In alternate embodiments, any number of points may be identified by a user or by another process. Next, two perspective vanishing points are defined using the four points identified above (block 906). The two perspective vanishing points are defined, for example, by extending lines on opposite sides of the quadrilateral shape until each pair of lines intersect one another.

Procedure 900 continues by determining a first set of reference points within the image (block 908). This first set of reference points may be determined, for example, by selecting reference points that define a rectangle or square within the quadrilateral shape discussed above. The procedure transforms the first set of reference points to determine a second set of reference points (block 910). This transformation may include applying a transformation matrix to the first set of reference points. Procedure 900 continues by estimating an aspect ratio based on the second set of reference points (block 912). The first set of reference points are then modified to have the same aspect ratio as the estimated aspect ratio (block 914). Finally, the procedure transforms the image by mapping the second set of reference points onto the modified first set of reference points (block 916). Completing the above procedure results in a correction of perspective distortion in the imaged scene.

It will be appreciated that the various methods described herein may be implemented, all or in part, as one or more computer programs or modules that include computer-executable instructions and/or computer readable data. These computer programs may be stored or embodied in one or more types of computer-readable medium. As used herein, a computer-readable medium may be any available medium that can store and/or embody computer-executable instructions and that may be accessed by a computer or computing process. As used herein, a computer program product comprises a computer program or module embodied in or on a computer-readable medium.

Figure 10:
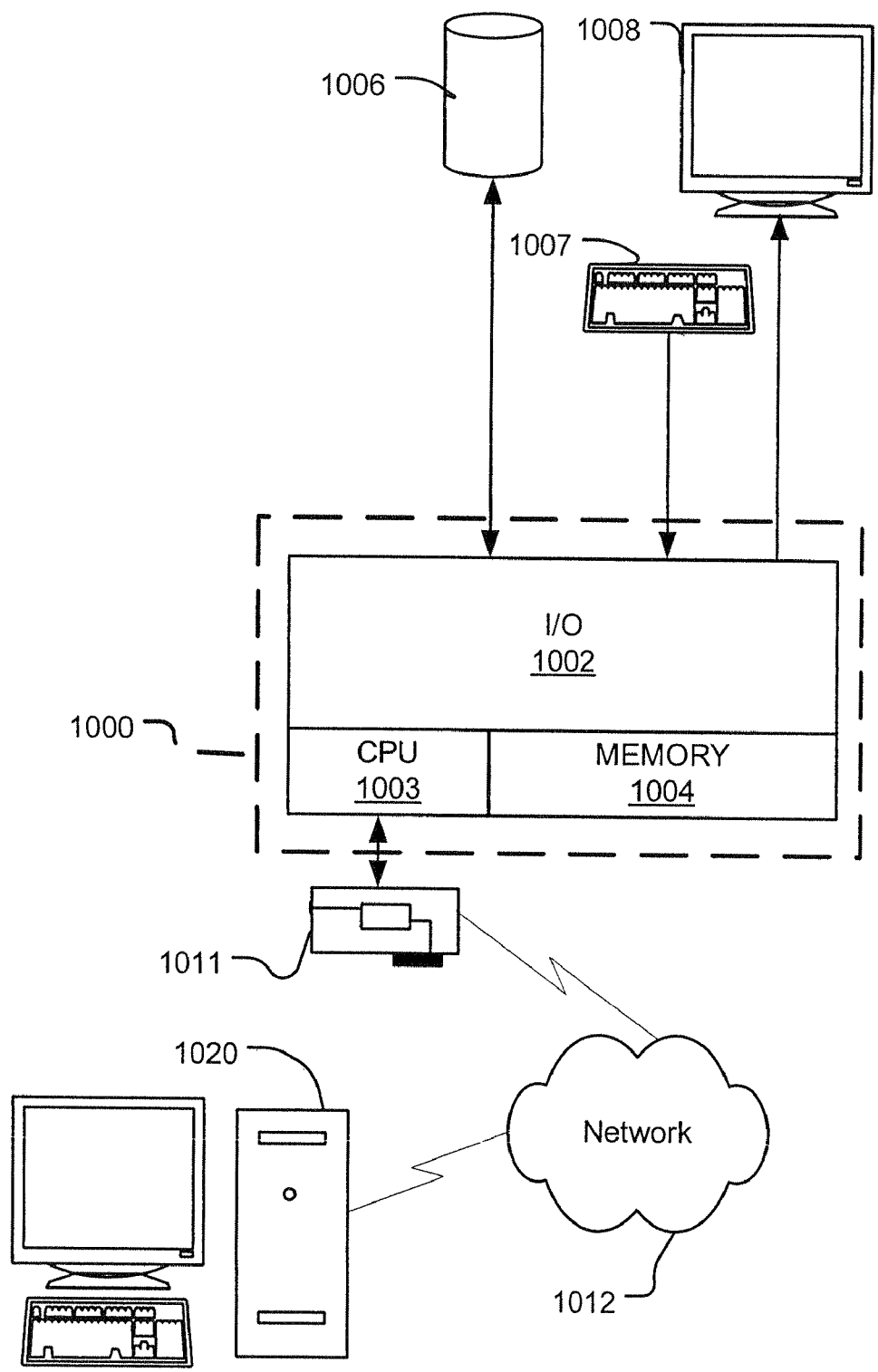
FIG. 10 illustrates an example of a computing system in which the various methods described herein may be implemented.

FIG. 10 illustrates one example of a computing system 1000 in which the various methods described herein may be implemented. In its most basic configuration, the computing system 1000 includes a processing unit 1003, an input/output (I/O) section 1002, and a main memory 1004, including volatile and/or non-volatile memory. Additionally, the computing system may include or have access to various mass storage devices or systems 1006, including various removable and/or non-removable mass storage devices. Examples of mass storage devices include, without limitation, various magnetic, optical, and/or non-volatile semiconductor memory, etc. In the case where the mass storage device comprises a number of storage devices, those devices may be distributed, such as across a computer network.

The computing system 1000 may have connected thereto input devices, such as a keyboard 1007, a mouse (not shown), various optical scanners or readers, microphones, video cameras, or various other computer input devices. The computing system 1000 may also have various output devices connected thereto, such as display devices 1008, speakers, printers, or various other computer output devices. The various input and output devices may be connected to the computing system 1000 via the I/O section 1002.

Other aspects of the computing system 1000 may include appropriate devices 1011 to establish network or communications connections to other devices, computers, networks, servers, etc., using either wired or wireless communication links, computer-readable media, and using various communications protocols. For example, the computing system 1000 is shown in FIG. 10 as being connected to a remote computing system 1020.

The computing system 1000 and the remote computing system 1020 may be a part of, or in communication with, computer networks 1012, such as Wide Area Networks (WAN), Local Area Network (LANs), the Internet, or any of various other computer networks.

Figure 11:
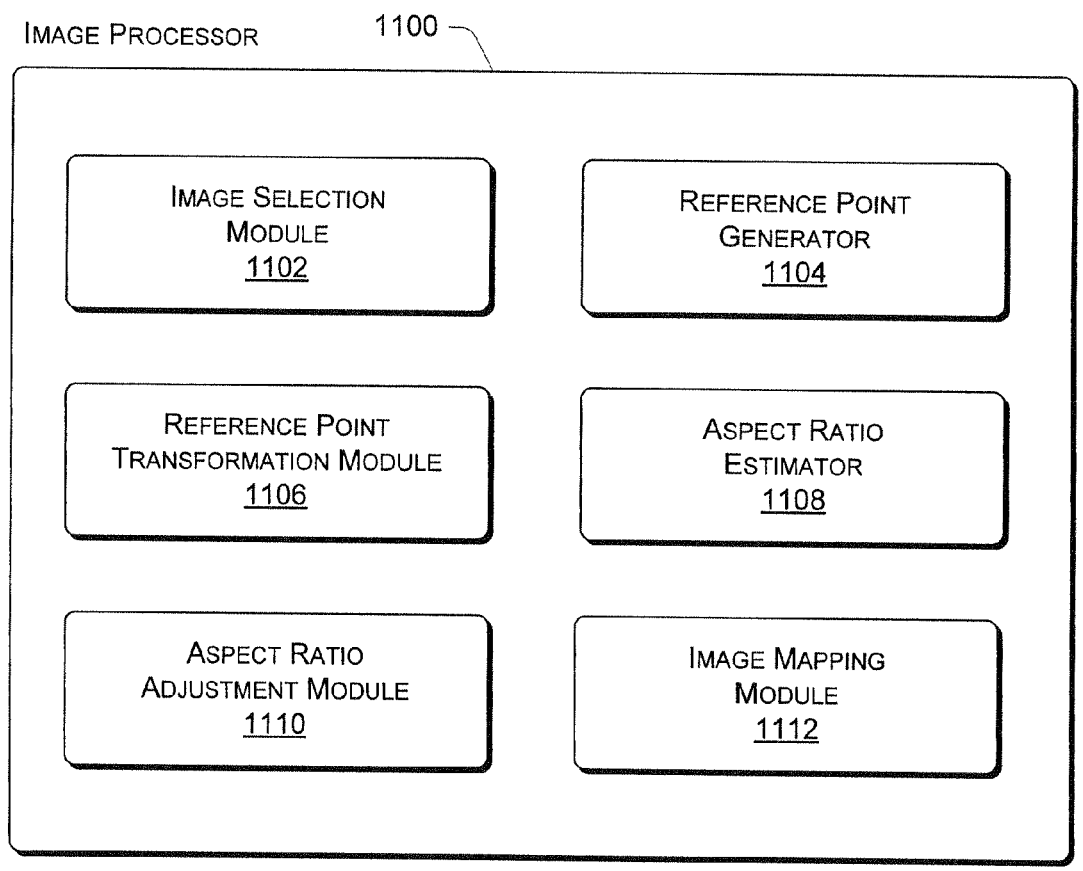
FIG. 11 illustrates an example image processor capable of implementing the various methods described herein.

FIG. 11 illustrates an example image processor 1100 capable of implementing the various methods described herein. Image processor 1100 may be a stand-alone device or may be incorporated into another device, such as an image capture device, a display device, or the like. In alternate embodiments, image processor 1100 may include one or more additional components and/or may omit one or more of the components shown in FIG. 11.

Image processor 1100 includes an image selection module 1102 that, for example, allows a user to select among various images to process or display. Image processor 1100 also includes a reference point generator 1104 to generate and/or identify reference points within an image. These reference points are used as discussed herein for processing one or more images. Reference point generator 1104 may also generate one or more vanishing points, as discussed herein. A reference point transformation module 1106 transforms one set of reference points to determine a second set of reference points. An aspect ratio estimator 1108 is capable of estimating an aspect ratio based on, for example, a set of reference points. An aspect ratio adjustment module 1110 modifies a set of reference points to have the same aspect ratio as the ratio estimated by aspect ratio estimator 1108. Finally, an image mapping module 1112 maps one set of reference points onto another set of reference points to create an image with reduced perspective distortion.

Particular embodiments of image processor 1100 may also include one or more interface components, storage components, processing components, communication components, and the like that are not shown in FIG. 11.

Although various implementations set forth herein have been described in language specific to structural features and/or methodological steps, it is to be understood that the invention defined in the appended claims is not necessarily limited to the specific features or steps described. Rather, the specific features and steps are disclosed as representative forms of implementing the claimed invention.

What is claimed is:

1. A method of correcting perspective distortion in an original image, the method comprising:
   determining two vanishing points associated with a plurality of points identified in the original image;
   defining a reference rectangle centered about a singular reference point, the singular reference point being bounded within the plurality of points;
   determining a set of reference points defining a reference quadrilateral within the reference rectangle, each reference point being located at an intersection of two lines, each line connecting a point on the reference rectangle to one of the vanishing points, the reference quadrilateral having an aspect ratio;
   transforming the reference rectangle to have the aspect ratio of the reference quadrilateral using a processor, so as to generate a modified reference rectangle;
   mapping the set of reference points onto the modified reference rectangle to generate a new image using a processor.

2. The method of claim 1, further comprising rotating the reference rectangle to ensure that lines extended from the two vanishing points through the singular reference point intersect adjacent sides of the reference rectangle.

3. The method of claim 1, further comprising receiving user input identifying the plurality of points.

4. The method of claim 1, wherein the plurality of points defines a quadrilateral and wherein determining the two vanishing points comprises extending pairs of lines on opposite sides of the quadrilateral until each pair of lines intersect one another.

5. The method of claim 1, wherein the singular reference point is located at a center of gravity of the plurality of points.

6. The method of claim 1, further comprising determining a metric that measures a change in scale of the new image relative to the original image.

7. The method of claim 6, wherein determining the metric comprises calculating an inverse of a minimum eigenvalue of a Jacobian of a transformation matrix used in mapping the set of reference points onto the modified reference rectangle.

8. The method of claim 1, wherein one of the two vanishing points is closer to the singular reference point and the other of the two vanishing points is farther from the singular reference point, wherein determining the set of reference points within the reference rectangle comprises:
- determining a side of the reference rectangle intersected by a line extended from the farther vanishing point through the singular reference point;
- identifying points on the reference rectangle that are intersected by lines extended from ends of the side opposite the determined side of the reference rectangle to the farther vanishing point, wherein the identified points and the ends of the side opposite the determined side of the reference rectangle define an interim quadrilateral.

9. The method of claim 8, wherein determining the set of reference points within the reference rectangle further comprises:
- determining a side of the interim quadrilateral intersected by a line extended from the closer vanishing point through the singular reference point;
- identifying points on another side of the interim quadrilateral that are intersected by lines extending from ends of the side opposite the determined side of the interim quadrilateral to the closer vanishing point, wherein the identified points on the another side of the interim quadrilateral and the ends of the side opposite the determined side of the interim quadrilateral define the reference quadrilateral.

10. The method of claim 1, wherein mapping the set of reference points onto the modified reference rectangle comprises applying a transformation matrix to the reference points, wherein the transformation matrix is an inverse of a perspective projection matrix.

11. The method of claim 1, wherein transforming the reference rectangle comprises modifying lengths of sides of the reference rectangle such that a ratio of the sides of the reference rectangle equals a ratio of sides of a quadrilateral defined by the plurality of points.

12. A computing system for correcting perspective distortion in an original image, the computing system comprising:
- a memory storing a reference point generator, a reference point transformation module, an aspect ratio adjustment module, and an image mapping module; and
- an image processor that implements
  - the reference point generator to define a reference rectangle centered about a singular reference point bounded within a plurality of points identified in the original image;
  - the reference point transformation module to determine a set of reference points defining a reference quadrilateral from the reference rectangle, each reference point being located at an intersection of two lines, each line connecting a point on the reference rectangle to one of two determined vanishing points, the reference quadrilateral having an aspect ratio;
  - the aspect ratio adjustment module to modify the reference rectangle to have an aspect ratio equal to the aspect ratio of the reference quadrilateral, so as to generate a modified reference rectangle; and
  - the image mapping module to map the set of reference points onto the modified reference rectangle to create a new image.

13. A computer readable medium storing computer executable instructions, which cause a computer to carry out a process, the process comprising:
- determining two vanishing points associated with a plurality of points identified in an original image;
- defining a reference rectangle centered about a singular reference point, the singular reference point being bounded within the plurality of points;
- determining a set of reference points defining a reference quadrilateral within the reference rectangle, each reference point being located at an intersection of two lines, each line connecting a point on the reference rectangle to one of the vanishing points, reference quadrilateral having an aspect ratio;
- transforming the reference rectangle to have the aspect ratio of reference quadrilateral, so as to generate a modified reference rectangle;
- mapping the set of reference points onto the modified reference rectangle to generate a new image.

14. The computer readable medium of claim 13, the process further comprising receiving user input identifying the plurality of points.

15. The computer readable medium of claim 13, wherein one of the two determined vanishing points is closer to the singular reference point and the other of the two vanishing points is farther from the singular reference point, wherein determining the set of reference points comprises:
- determining a side of the reference rectangle intersected by a line extended from the farther vanishing point through the singular reference point;
- identifying points on the reference rectangle that are intersected by lines extended from ends of the side opposite the determined side of the reference rectangle to the farther vanishing point, wherein the identified points and the ends of the side opposite the determined side of the reference rectangle define an interim quadrilateral.

16. The computer readable medium of claim 15, wherein determining the set of reference points further comprises:
- determining a side of the interim quadrilateral intersected by a line extended from the closer vanishing point through the singular reference point;
- identifying points on another side of the interim quadrilateral that are intersected by lines extending from ends of the side opposite the determined side of the interim quadrilateral to the closer vanishing point, wherein the identified points on the another side of the interim quadrilateral and the ends of the side opposite the determined side of the interim quadrilateral define a reference quadrilateral.

17. The computer readable medium of claim 13, further comprising estimating the aspect ratio of the set of reference points.

18. The computer readable medium of claim 13, wherein mapping the set of reference points onto the modified reference rectangle comprises applying a transformation matrix to the reference points, wherein the transformation matrix is an inverse of a perspective projection matrix.

19. The computer readable medium of claim 13, wherein the transforming the reference rectangle to have the aspect ratio of the set of reference points comprises modifying lengths of sides of the reference rectangle such that a ratio of the sides of the reference rectangle equals a ratio of sides of a quadrilateral defined by the plurality of points.

20. The computer readable medium of claim 13, wherein the singular reference point is located at a center of gravity of the plurality of points.

21. The computer readable medium of claim 13, the process further comprising rotating the reference rectangle to ensure that lines extended from the two vanishing points through the singular reference point intersect adjacent sides of the reference rectangle.

* * * * *

UNITED STATES PATENT AND TRADEMARK OFFICE
CERTIFICATE OF CORRECTION

| | | |
|---|---|---|
| PATENT NO. | : 7,737,967 B2 | Page 1 of 1 |
| APPLICATION NO. | : 11/772775 | |
| DATED | : June 15, 2010 | |
| INVENTOR(S) | : Dimitry Alexandrovich Chernichenko et al. | |

It is certified that error appears in the above-identified patent and that said Letters Patent is hereby corrected as shown below:

- Column 5, line 45, delete "$VP_1$," and insert --$VP_1$--, therefor.
- Column 6, line 41, delete "$VP_1$," and insert --$VP_1$--, therefor.
- Column 7, line 54, delete "$VP_1$," and insert --$VP_1$--, therefor.
- Column 7, line 59, delete "$VP_1$," and insert --$VP_1$--, therefor.
- Column 8, line 24, delete "Wand" and insert --W and--, therefor.
- Column 8, line 30, delete "$VP_1$," and insert --$VP_1$--, therefor.
- Column 8, line 49, "VP2" should read "$VP_2$".
- Column 8, line 51, "VP2" should read "$VP_2$".
- Column 8, line 53, "VP2" should read "$VP_2$".
- Column 8, line 60, "VP1" should read "$VP_1$".
- Column 8, line 63, "VP1" should read "$VP_1$".
- Column 9, line 8, delete "$VP_1$," and insert --$VP_1$--, therefor.
- Column 10, line 67, "VP1" should read "$VP_1$".
- Column 11, line 8, "VP2" should read "$VP_2$".
- Column 16, line 29, of Claim 13, delete "of" and insert --of the --, therefor.

Signed and Sealed this
Fifteenth Day of May, 2012

David J. Kappos
*Director of the United States Patent and Trademark Office*